United States Patent Office 3,419,539
Patented Dec. 31, 1968

3,419,539
METHOD OF PRODUCING CIS-1,4 POLYBUTADIENE
Kenichi Ueda, Hidetoshi Yasunaga, Koei Komatsu, and Jun Hirota, Yokkaichi-shi, Japan, assignors to Japan Synthetic Rubber Co., Ltd., Tokyo, Japan, a corporation of Japan
No Drawing. Filed Mar. 16, 1966, Ser. No. 534,682
Claims priority, application Japan, Mar. 18, 1965, 40/15,575
9 Claims. (Cl. 260—94.3)

ABSTRACT OF THE DISCLOSURE

A method for producing polybutadiene of high cis-1,4 content by polymerizing butadiene in the presence of a hydrocarbon solvent, an inert atmosphere and a catalyst at a temperature between −50° and 150° C. The catalyst is a mixture of an aluminum halide and a nickel oxide of the formula $Ni_xO_y$, wherein $x$ is 1 or 2, $y$ is in the range of 1 to 3 and the ratio of $y$ to $x$ is 1–1.5:1, but excluding a ratio of 1:1.

---

This invention relates to a method of producing cis-1,4 polybutadiene. More particularly it relates to a method of producing a butadiene polymer having a high percentage of cis-1,4 configuration using a novel polymerization catalyst.

The mechanical, physical and other properties of the vulcanized product of cis-1,4 polybutadiene having a high percentage of cis-1,4 configuration have proven for the last several years that such a polymer is superior as a general purpose rubber.

It has been heretofore known that cis-1,4 polybutadiene can be produced by contacting butadiene in the presence of non-aqueous medium with a catalyst such as (1) a reaction mixture of a salt of a metal of Group VIII of the Periodic Table and an organometallic compound, particularly an organometallic halogen compound of a metal of Group I, II or III of the table, (2) a reaction mixture of a salt of a metal of Group VIII of the table, an organometallic compound of a metal of Group I, II or III of the table and a Lewis acid, and (3) a reaction mixture of an organometallic compound of a metal of Group I, II or III of the table and a Lewis acid.

All of the above-mentioned catalytic systems are so-called Ziegler type catalysts, which contain, as one component of the catalyst, an organometallic compound. As is well known, since organometallic compounds react violently with oxygen or moisture in the air, their handling is very difficult, and even when they are stored under an inert atmosphere, they deteriorate by reacting with trace amounts of oxygen or moisture present in the inert gas. Therefore, these organometallic compounds are produced only with great difficulty and are very expensive. Further, such deterioration of organometallic compounds or of reaction mixtures comprising these organometallic compounds during their storage results in poor reproducibility of polymerization velocity and of molecular weight and various other properties of the polymer produced thereby.

There have been known two methods of polymerizing butadiene with catalysts containing no organometallic compounds to obtain cis-1,4 polybutadiene. Japanese Patent Publication 9,443/63 discloses a method which comprises contacting butadiene with a three-component catalyst consisting of (a) at least one metal or anhydrous compound of divalent transition metals, i.e. cobalt, nickel, chromium, iron, manganese, palladium and platinum, (b) an anhydrous aluminum halide and (c) a proton acceptor. In this method, a temperature of higher than 100° C. is required for the preparation of the catalyst, and the polymerization velocity is low. Japanese Patent Publication 20,826/64 discloses a method of polymerizing butadiene with a catalyst prepared by mixing at a temperature from 20° to 150° C. (a) an aromatic hydrocarbon solvent selected from the group consisting of benzene, alkylbenzenes and monohalo-nuclear substituted products thereof, (b) aluminum metal, (c) a cobaltous halide and (d) a hydrogen halide or mercuric halide. Polybutadiene produced by this method contains a large amount of gel.

An object of this invention is to provide a method of polymerizing butadiene using a novel catalyst containing no organometallic compound.

Another object of this invention is to provide a novel method of polymerizing butadiene, which has none of the disadvantages as above-mentioned.

Other and further objects and advantages of the invention will become apparent to those skilled in the art upon consideration of the accompanying disclosure.

We have now discovered that a butadiene polymer having a high percentage of cis-1,4 configuration can be produced by contacting butadiene in the presence of a hydrocarbon solvent at a temperature between −50° C. and 150° C. under an inert gas atmosphere with a catalyst prepared by mixing, under controlled conditions in a hydrocarbon solvent under an inert gas atmosphere, (1) a halide of aluminum and (2) an oxide of nickel of the formula $Ni_xO_y$, wherein $x$ is an integer from 1 to 2, $y$ is in the range of 1 to 3 and the ratio of $y$ to $x$ is in the range of 1–1.5:1, but excluding a ratio of 1:1 and wherein said oxide of nickel contains no active oxygen capable of oxidizing potassium iodide at room temperature.

We have already provided a method of producing cis-1,4 polybutadiene with a catalyst prepared by mixing an aluminum halide and a nickel peroxide which contains at least 0.1 milligram equivalent of active oxygen, per gram of the peroxide, capable of oxidizing potassium iodide at room temperature (U.S. patent application No. 450,184, filed on Apr. 22, 1965).

We had believed that the nickel peroxide in this catalyst system had to contain at least 0.1 milligram equivalent of the active oxygen per gram of the peroxide to produce cis-1,4 polybutadiene, because the usual nickel oxide (NiO) does not contain any active oxygen and the catalyst consisting of nickel oxide and aluminum chloride gives oily polymers having a low cis-1,4 configuration with low polymerization activity.

But we have unexpectedly discovered that an oxide of nickel having the formula $Ni_xO_y$ of the present invention is effective for the production of polybutadiene having a high percentage of cis-1,4 configuration, though it does not contain any such active oxygen.

Oxides of nickel which can be used as one component of the catalyst of the present invention are represented by the formula $Ni_xO_y$, wherein $x$ is an integer from 1 to 2, $y$ is in the range of 1 to 3 and the ratio of $y$ to $x$ is in the range of 1–1.5:1, but excluding a ratio of 1:1. The valency state of nickel of the oxides of the present invention is higher than II. Namely these oxides have excess oxygen compared with nickel oxide (NiO). These oxides are well known and are defined as the Bertholide compound [G. Hagg; Acta Chem. Scand., 4, 88 (1950)].

These oxides of nickel can usually be prepared by heating or thermally cracking an inorganic salt of divalent nickel at a temperature below 700° C. in the presence of oxygen or air, or in vacuo.

Commercially available nickel black, which is believed to have the molecular formula $Ni_2O_3$, can also be used in this invention.

Among the inorganic salts of divalent nickel, nickel nitrate, nickel sulfate, nickel phosphate, nickel fluoride, nickel chloride, nickel bromide, nickel iodide and nickel hydroxide are preferable. Nickel nitrate and nickel hydroxide are particularly preferable.

The temperature of the heating or thermal cracking must not be higher than 700° C., since at temperatures higher than 700° C., nickel oxide (NiO) is formed.

In general the ratio of $y$ to $x$ of the formula $Ni_xO_y$ varies depending on both the temperature and the time of the heating or thermal cracking. For example, when nickel nitrate is oxidized in an oxygen stream at 550° C. for 2 hours, an oxide of nickel having a ratio of $y:x$ of from 1.05 to 1.20 is obtained. When the same oxidation is carried out at 350° C., an oxide of nickel having a ratio of $y:x$ from 1.15 to 1.50 is obtained. A temperature between 200° C. and 600° C. is usually preferred for the heating or thermal cracking. But when an oxide of nickel having a large $y:x$ ratio, e.g. from 1.35 to 1.50, is desired, a temperature below 200° C. is suitable, but requires a long period of time, usually more than 5 hours for the heating or thermal cracking.

These oxides of nickel have the color of black or gray, and not the usual green of nickel oxide (NiO).

Furthermore these oxides of nickel may be prepared by heating at suitable temperature, for example at 200° C., nickel peroxides which contain at least 0.1 milligram equivalent of active oxygen, per gram of the peroxide, capable of oxidizing potassium iodide at room temperature. The thusly produced oxides of nickel have a gray color and do not contain any appreciable amount of such active oxygen.

Halides of aluminum which are another catalyst component of this invention are anhydrous aluminum chloride, aluminum bromide and aluminum iodide. In general it is desirable that these halides be highly purified before use.

The catalyst of this invention can be prepared by mixing the two catalyst components described above at under controlled conditions in a hydrocarbon solvent under an inert gas atmosphere. The two catalyst components react with each other, and the color of the reaction mixture changes from yellow to brownish black. The resulting reaction mixture has polymerization activity. Though the conditions of the catalyst preparation can be varied depending upon the nature of the catalyst components, the desired polymerization conditions and so on, the catalyst is preferably prepared by contacting the two components at a temperature between 20° C. and 150° C. for from 1 to 500 minutes.

The proportion of the halide of aluminum to the oxide of nickel can be varied over a wide range, but preferably is in the range of 0.1 to 10.0, more preferably is in the range of 0.5 to 3.0, based on the mole ratio of aluminum atom to nickel atom.

The polymerization reaction of the invention can be carried out as a batch or continuous process in the presence of a hydrocarbon solvent at a temperature between −50° C. and 150° C., preferably between 0° C. and 100° C., under an inert gas atmosphere.

Hydrocarbon solvents which are used for the catalyst preparation and polymerization reaction are aromatic, aliphatic and alicyclic hydrocarbons. Suitable solvents include aromatics such as benzene, toluene and xylene, aliphatics such as pentane, hexane, heptane, octane, nonane, decane, butane and propane, and alicyclics such as cyclohexane and cyclopentane. A mixture of these hydrocarbons can also be used as the solvent.

Generally it is advantageous to use the same hydrocarbon solvent for both the catalyst preparation and for the polymerization process, however different hydrocarbon solvents can, of course, be employed in the two steps. Aromatic hydrocarbons are most preferable for the catalyst preparation.

The polymerization reaction is carried out in the presence of from about 0.5 to about 50 parts by volume of hydrocarbon solvent per part by volume of butadiene.

The polymerization must be carried out under an inert gas atmosphere such as nitrogen, helium and argon.

The polymerization reaction can be carried out under autogeneous pressure or any suitable pressure sufficient to maintain the reaction mixture substantially in the liquid phase.

The amount of catalyst to be used can be varied over a wide range depending upon the conditions of the catalyst preparation and polymerization reaction. Preferably the amount of the catalyst is in the range of 0.1 to 200, more preferably 1.0 to 100 millimoles based on the oxide of nickel per 10 moles of butadiene.

At the completion of the polymerization reaction, the catalyst is inactivated by adding water, alcohol, acetone or other inactivating agents to the polymerization system. There is also added to the polymerization system an antioxidant such as phenyl-$\beta$-naphthyl amine.

The resulting polybutadiene is coagulated by adding a poor solvent such as alcohol to the polymerization system, or by removing the solvent through steam distillation, and is then separated, washed and dried as usual.

The thus produced polybutadiene has at least 75 percent of cis-1,4 configuration. It can be compounded and vulcanized by any of the known methods and used as a general purpose rubber in various fields.

The two catalyst components of this invention are readily available and are inexpensive. Also, the catalyst preparation is easy.

Another advantage of this invention is that both the catalyst and the components thereof can be stored for a long period of time and can be handled safely.

Another advantage of this invention is that a high cis-1,4 polybutadiene which is gel free can be produced with good reproducibility and high polymerization activity.

A more comprehensive understanding of this invention can be obtained by referring to the following illustrative examples which are not intended, however, to be unduly limitative of the invention.

In the examples, the microstructure of the polymer was analysed according to the D. Morero Method [Chemica é L'industria, 91, 758 (1959)] by infra-red spectra analysis.

Intrinsic viscosity $[\eta]$ (dl./g.) was measured at 30° C. in toluene.

Analysis of oxides of nickel was made by determining nickel with the EDTA Method and by determining oxygen by elemental analysis.

Active oxygen capable of oxidizing potassium iodide at room temperature was determined by potentiometric titration.

Example 1

Under an atmosphere of nitrogen from which oxygen and moisture were completely eliminated by passage through anhydrous calcium chloride, molecular sieves and then triethyl aluminum solution (0.5% by weight tetraline solution), 26.60 grams of toluene sufficiently dried by distillation in the presence of metallic sodium was introduced into a 100 milliliter pressure-resistant reaction vessel with a syringe from the top of the vessel.

Then 0.06829 gram of anhydrous aluminum chloride sufficiently purified by sublimation and 0.0377 gram of an oxide of nickel having the molecular formula $NiO_{1.07}$ were added to the vessel.

The oxide of nickel was produced by heating crystalline nickel nitrate in an oxygen stream at 550° C. for 140 minutes. It was confirmed that the oxide of nickel had the molecular formula $NiO_{1.07}$ and had no active oxygen.

Following this charge, the vessel was sealed with a crown cap having a butyl rubber packing under a nitrogen gas atmosphere. Then the reaction vessel was placed in a thermostat of 60±0.5° C. After 60 minutes, the color of the reaction mixture turned to brownish black. At this time the reaction vessel was taken out of the thermostat. The crown cap was removed therefrom under a nitrogen gas atmosphere, and the reaction vessel was immersed in a dry ice-methanol bath of −80° C. 6.65 grams of butadiene which was purified by passage through granular potassium hydroxide, calcium chloride, granular potassium hydroxide and molecular sieves in that order, were introduced into the reaction vessel by distillation. Then the top of the reaction vessel was sealed.

Then the reaction vessel was tumbled in a large thermostat at 10±0.1° C. for 19 hours. At the end of this time, methanol containing phenyl-β-naphthyl amine was poured into the reaction vessel to precipitate the polymer. The precipitate was redissolved in toluene and then precipitated again with methanol containing a small amount of dilute hydrochloric acid. The precipitate was separated and dried at 30° C. for 48 hours in vacuo.

Rubbery polybutadiene which was completely soluble in toluene and gel free was obtained. The yield was 3.18 grams. The microstructure of the polymer was 92.2% of cis-1,4, 4.0% of trans-1,4 and 3.8% of vinyl. The intrinsic viscosity of the polymer was 2.00.

Examples 2 to 5

Butadiene was polymerized by the same method as in Example 1 except that the ratio of the two catalyst components was changed.

The results are shown in Table 1.

about 61% of cis-1,4, about 31% of trans-1,4 and the balance of vinyl. Therefore it is clear that nickel oxide (NiO) cannot be used for the catalyst of this invention.

Example 14

The catalyst was prepared by contacting 0.0293 gram of an oxide of nickel having the molecular formula $NoO_{1.05}$ and 0.0639 gram of aluminum chloride at 60° C. for 2 hours in toluene.

The oxide of nickel was produced as follows:

Into a quartz glass tube, 5.47 grams of nickel fluoride powder were introduced. The glass tube was placed in an electric furnace and then oxygen gas sufficiently dried by passage through calcium chloride and molecular sieves was streamed into the tube. The tube was gradually heated and was maintained at a temperature between 540° C. and 560° C. for 130 minutes. Then the tube was gradually cooled. 2.58 grams of the oxide of nickel were obtained. The color of the oxide of nickel was greenish black. The oxide of nickel had the molecular formula $NiO_{1.05}$ and has no active oxygen.

With this catalyst, 6.65 grams of butadiene were polymerized at 5° C. for 17 hours in toluene. Polybutadiene having an intrinsic viscosity of 2.15 was obtained with a yield of 65.0%. The microstructure was 82.4% of cis-1,4, 13.2% of trans-1,4 and 4.4% of vinyl.

Example 15

An oxide of nickel having the molecular formula $NiO_{1.03}$ was produced by oxidizing nickel sulfate by the

TABLE 1

| Example | $NiO_{1.07}$ (mmol) | $AlCl_3$ (mmol) | Al/Ni (mol/mol) | Polymerization time (hr.) | Conversion (percent) | [η] | Microstructure (percent) | | |
|---|---|---|---|---|---|---|---|---|---|
| | | | | | | | Cis-1,4 | Trans-1,4 | Vinyl |
| 2 | 0.552 | 0.553 | 1.0 | 20.1 | 55.0 | 2.16 | 80.7 | 14.3 | 5.0 |
| 3 | 0.349 | 0.523 | 1.5 | 20.1 | 51.6 | 2.04 | | | |
| 4 | 0.287 | 0.542 | 1.89 | 19.3 | 11.2 | 1.92 | 82.3 | 12.7 | 5.0 |
| 5 | 0.248 | 0.495 | 2.00 | 20.1 | 49.1 | 1.88 | 82.1 | 13.1 | 4.8 |

Examples 6 to 8

In these examples 6.65 grams of butadiene were polymerized by the same procedure as in Example 1, but using an oxide of nickel of the molecular formula $NiO_{1.5}$ which was produced by heating nickel nitrate at 350° C. for 4 hours.

The polymerization conditions and the results are shown in Table 2.

same procedure as in Example 14. This oxide of nickel did not contain any active oxygen.

Butadiene (6.65 grams) was polymerized at 40° C. for 17.1 hours in toluene with a catalyst prepared by contacting 0.254 millimole of the oxide of nickel and 0.512 millimole of aluminum chloride at 60° C. for 2 hours in toluene.

Polybutadiene was obtained with a yield of 80.1%. The

TABLE 2

| Example | $NiO_{1.5}$ (mmol) | $AlCl_3$ (mmol) | Al/Ni (mol/mol) | Polymerization time (hr.) | Polymerization temp. (° C.) | Conversion (percent) | Microstructure (percent) | | |
|---|---|---|---|---|---|---|---|---|---|
| | | | | | | | Cis-1,4 | Trans-1,4 | Vinyl |
| 6 | 0.922 | 0.461 | 0.5 | 2.0 | 40 | 9.50 | 91.4 | 4.4 | 4.2 |
| 7 | 0.436 | 0.436 | 1.0 | 2.0 | 40 | 11.82 | 88.8 | 6.5 | 4.7 |
| 8 | 0.315 | 0.472 | 1.5 | 2.0 | 40 | 44.12 | 87.0 | 7.7 | 5.3 |

Examples 9 to 13

In these examples, 6.65 grams of butadiene was polymerized with the same procedure as in Example 1, but using commercially available nickel black.

The polymerization conditions and the results are shown in Table 3.

intrinsic viscosity was 1.96. The microstructure was 89.1% of cis-1,4, 6.6% of trans-1,4 and 4.3% of vinyl.

Example 16

An oxide of nickel having the molecular formula $NiO_{1.06}$ was produced by oxidizing nickel chloride by the

TABLE 3

| Ex. | Nickel black (mmol) | $AlCl_3$ (mmol) | Al/Ni (mol/mol) | Polymerization temp. (° C.) | Polymerization time (hr.) | Conversion (percent) | [η] | Microstructure (percent) | | |
|---|---|---|---|---|---|---|---|---|---|---|
| | | | | | | | | Cis-1,4 | Trans-1,4 | Vinyl |
| 9 | 0.376 | 0.752 | 2.0 | 0 | 3.0 | 69.6 | 2.28 | 87.6 | 7.0 | 5.4 |
| 10 | 0.260 | 0.520 | 2.0 | 0 | 4.0 | 66.6 | 2.36 | 91.6 | 4.1 | 4.3 |
| 11 | 0.405 | 0.809 | 2.0 | 30 | 3.5 | 88.9 | 1.76 | 88.5 | 6.9 | 4.6 |
| 12 | 0.246 | 0.429 | 2.0 | 30 | 3.5 | 82.6 | 1.98 | 91.2 | 4.2 | 4.6 |
| 13 | 0.123 | 0.245 | 2.0 | 30 | 5.0 | 51.2 | 2.24 | 89.2 | 6.3 | 4.5 |

When nickel oxide (NiO) was used instead of nickel black in Examples 9 and 10, oily products were obtained in both runs with a conversion of less than 5%, even though the polymerizations were carried out for 16 hours at 0° C. The microstructure of the oily polymers was same procedure as in Example 14. This oxide of nickel did not contain any active oxygen.

Butadiene (6.65 grams) was polymerized at 40° C. for 3.5 hours in toluene with a catalyst prepared by contacting 0.251 millimole of the oxide of nickel and 0.493 millimole of aluminum chloride at 60° C. for 2 hours in toluene.

Polybutadiene having an intrinsic viscosity of 2.12 was obtained with a yield of 40.1%. The microstructure was 90.6% of cis-1,4, 6.8% of trans-1,4 and 2.6% of vinyl.

Example 17

In this example, an oxide of nickel was produced by the procedure set forth hereinbelow.

Crystalline nickel sulfate (6.5 grams) and sodium hydroxide (3.0 grams) were dissolved in 100 grams of distilled water. 15 milliliters of 6% by weight aqueous solution of sodium hypochlorite was dropped into the solution. A precipitate was formed. The precipitate was separated, washed and dried. 5.8 grams of a nickel peroxide having the molecular formula $Ni(OH)_3$ and containing 3.0 milligram equivalents of active oxygen per gram of the peroxide were obtained. Then the nickel peroxide was heated at 700° C. for 2 hours in the presence of oxygen in a quartz glass tube. An oxide of nickel having the molecular formula $NiO_{1.09}$ was obtained. 1 gram of the oxide of nickel contained only 0.004 milligram equivalent of active oxygen.

Butadiene was polymerized by the same method as in Example 1 except that the catalyst was prepared by mixing 1.343 millimoles of the oxide of nickel and 0.507 millimole of aluminum chloride and that the polymerization was carried out at 40° C. for 2 hours.

Polybutadiene having an intrinsic viscosity of 1.51 was obtained with a yield of 74.3%. The microstructure was 82.2% of cis-1,4, 12.4% of trans-1,4 and 5.4% of vinyl.

On the other hand, when polymerization of butadiene was carried out by the same method except that nickel oxide (NiO) produced by heating the nickel peroxide $(Ni(OH)_3)$ at 1,200° C. for 2 hours was employed instead of the oxide of nickel $(NiO_{1.09})$, no polymer of butadiene could be obtained even after 24 hours.

Examples 18 and 19

Butadiene (6.65 grams) was polymerized in toluene by the same procedure as in Example 1 except that aluminum bromide and iodide were used instead of aluminum chloride. The conditions for the catalyst preparation were the same as in Example 1.

The polymerization conditions and the results are shown in Table 4.

Example 20

Butadiene (6.65 grams) was polymerized at 5° C. for 20 hours in 26.6 grams of benzene with a catalyst prepared by contacting 0.512 millimole of the oxide of nickel having the molecular formula $NiO_{1.07}$ as prepared in Example 1 and 0.512 millimole of aluminum chloride at 60° C. for 1 hour in benzene.

Polybutadiene was obtained with a yield of 52.3%. The intrinsic viscosity was 2.30. The microstructure was 82.6% of cis-1,4, 12.2% of trans-1,4 and 5.2% of vinyl.

Example 21

Butadiene (6.65 grams) was polymerized at 40° C. for 17 hours in 26.6 grams of n-hexane with a catalyst prepared by contacting 0.512 millimole of the oxide of nickel $(NiO_{1.07})$ as prepared in Example 1 and 0.532 millimole of aluminum chloride at 60° C. for 1 hour in n-hexane.

Polybutadiene was obtained with a yield of 38.1%. The intrinsic viscosity was 2.11. The microstructure was 86.1% of cis-1,4, 9.1% of trans-1,4 and 4.8% of vinyl. 5.2% of the polymer was insoluble in toluene.

Example 22

The catalyst was prepared by contacting 0.500 millimole of commercially available nickel black and 0.500 millimole of aluminum chloride at 60° C. for 1 hour in 10.1 grams of toluene. 6.65 grams of butadiene were polymerized at 40° C. for 4 hours in 26.6 grams of cyclohexane with the catalyst.

Polybutadiene having an intrinsic viscosity of 1.41 was obtained with a yield of 16.1%. The microstructure of the polymer was 81.9% of cis-1,4, 13.2% of trans-1,4 and 4.9% of vinyl.

Examples 23 to 28

In these examples, the catalysts were prepared by contacting 0.521 millimole of commercially available nickel black and 0.278 millimole of aluminum chloride in 26.6 grams of toluene under the conditions shown in Table 5. 6.65 grams of butadiene were polymerized at 40° C. for 2 hours with these catalysts. Results are shown in Table 5.

TABLE 5

| Example | Catalyst preparation condition | | Conversion (percent) | [η] | Microstructure (percent) | | |
|---|---|---|---|---|---|---|---|
| | Temp. (° C.) | Time (min.) | | | Cis-1,4 | Trans-1,4 | Vinyl |
| 23 | 30 | 300 | 55.2 | 1.31 | 88.2 | 8.6 | 3.2 |
| 24 | 60 | 60 | 81.2 | 2.13 | 91.3 | 4.2 | 4.5 |
| 25 | 60 | 120 | 78.3 | 2.56 | | | |
| 26 | 85 | 30 | 70.1 | 2.12 | 87.4 | 9.1 | 3.5 |
| 27 | 85 | 180 | 83.6 | 2.45 | 89.2 | 7.4 | 3.4 |
| 28 | 110 | 120 | 90.0 | 2.45 | 92.3 | 5.8 | 1.9 |

TABLE 4

| Example | Aluminum halide (mmol) | $NiO_{1.07}$ (mmol) | Polymerization temp. (° C.) | Polymerization time (hr.) | Conversion (percent) | [η] | Microstructure (percent) | | |
|---|---|---|---|---|---|---|---|---|---|
| | | | | | | | Cis-1,4 | Trans-1,4 | Vinyl |
| 18 | $AlBr_3$ 0.553 | 0.552 | 40 | 3.5 | 61.2 | 1.86 | 83.6 | 10.6 | 5.8 |
| 19 | $AlI_3$ 0.474 | 0.473 | 40 | 3.5 | 36.6 | 1.66 | 85.4 | 9.6 | 5.2 |

What is claimed is:

1. A method for producing a butadiene polymer having a high percentage of cis-1,4 configuration, said method comprising contacting butadiene in the presence of a hydrocarbon solvent at a temperature between −50° C. and 150° C. under an inert gas atmosphere with a catalyst, said catalyst being prepared by mixing, in a hydrocarbon solvent under an inert gas atmosphere, a halide of aluminum and an oxide of nickel of the formula $Ni_xO_y$, wherein $x$ is an integer from 1 to 2, $y$ is in the range of 1 to 3 and the ratio of $y$ to $x$ is in the range of 1–1.5:1, but excluding a ratio of 1:1; and wherein said oxide of nickel contains no active oxygen capable of oxidizing potassium iodide at room temperature.

2. A method according to claim 1, wherein the contacting is effected at a temperature between 0° C. and 100° C.

3. A method according to claim 1, wherein the halide of aluminum and the oxide of nickel are mixed at a temperature between 20° C. and 150° C. for a period of from 1 to 500 minutes.

4. A method according to claim 1, wherein the catalyst has a mole ratio of aluminum atom to nickel atom within the range of 0.1 to 10.0 to 1.

5. A method according to claim 1, wherein the catalyst is present in an amount corresponding to 0.1 to 200 millimoles based on the oxide of nickel per 10 moles of butadiene.

6. A method according to claim 1, wherein the contacting is carried out in the presence of from 0.5 to 50 parts by volume of a hydrocarbon solvent per 1 part by volume of butadiene 7. A method according to claim 1, wherein the halide of aluminum is anhydrous aluminum chloride, bromide or iodide.

8. A butadiene polymerization catalyst consisting of a mixture of a halide of aluminum and an oxide of nickel of the formula $Ni_xO_y$, wherein $x$ is an integer from 1 to 2, $y$ is in the range of 1 to 3 and the ratio of $y$ to $x$ is in the range of 1–1.5:1, but excluding a ratio of 1:1; and wherein said oxide of nickel contains no active oxygen capable of oxidizing potassium iodide at room temperature.

9. A butadiene polymerization catalyst according to claim 8, wherein the halide of aluminum is anhydrous aluminum chloride, bromide or iodide.

References Cited

Sidgwick, N. V. "Chemical Elements and their Compounds" Oxford University Press, pp. 1449–1451 (1950).

JOSEPH L. SCHOFER, *Primary Examiner.*

R. A. GAITHER, *Assistant Examiner.*

U.S. Cl. X.R.

252—466